(12) United States Patent
Takemoto et al.

(10) Patent No.: US 8,393,890 B2
(45) Date of Patent: Mar. 12, 2013

(54) INJECTION MOLDING MACHINE

(75) Inventors: Atsushi Takemoto, Numazu (JP);
Hideaki Kitta, Numazu (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 0 days.

(21) Appl. No.: 12/970,703

(22) Filed: Dec. 16, 2010

(65) Prior Publication Data
US 2012/0128813 A1    May 24, 2012

(30) Foreign Application Priority Data

Dec. 17, 2009  (JP) ................................. 2009-286354
May 31, 2010  (JP) ................................. 2010-123663
Nov. 18, 2010  (JP) ................................. 2010-258135

(51) Int. Cl.
*B29C 45/64* (2006.01)

(52) U.S. Cl. .......................................... 425/589; 100/46

(58) Field of Classification Search .................... 100/46; 425/589
See application file for complete search history.

(56) References Cited

U.S. PATENT DOCUMENTS

| | | | | |
|---|---|---|---|---|
| 2,309,944 A * | 2/1943 | Flowers | | 100/46 |
| 2,353,389 A * | 7/1944 | Cannon | | 100/46 |
| 2,400,685 A * | 5/1946 | Collins | | 60/426 |
| 6,524,095 B1 * | 2/2003 | Ito et al. | | 425/574 |
| 7,021,924 B2 * | 4/2006 | Oyama | | 425/571 |
| 2007/0224308 A1 | 9/2007 | Nishimura | | |
| 2009/0011064 A1 * | 1/2009 | Satou | | 425/150 |

FOREIGN PATENT DOCUMENTS

| | | |
|---|---|---|
| DE | 600 14 808 | 2/2005 |
| DE | 11 2006 001 060 | 5/2008 |
| JP | 2001-38764 | 2/2001 |
| JP | 2010-241076 | 10/2010 |

OTHER PUBLICATIONS

English Language Abstract of JP 2001-038764 published Feb. 13, 2001.
English Language Translation of JP 2001-038764 published Feb. 13, 2001.
German Office Action issued in DE 10 2010 054 606.2 on Jun. 18, 2012.
English Language Translation of German Office Action issued in DE 10 2010 054 606.2 on Jun. 18, 2012.
English Language Abstract of DE 600 14 808 published on Feb. 17, 2005.
English Language Abstract of DE 11 2006 001 060 published on May 29, 2008.
English Language Abstract of JP 2010-241076 published on Oct. 28, 2010.
English Language Translation of JP 2010-241076 published on Oct. 28, 2010.

* cited by examiner

*Primary Examiner* — Tim Heitbrink
(74) *Attorney, Agent, or Firm* — DLA Piper LLP (US)

(57) ABSTRACT

An injection molding machine that can prevent a stationary platen and a mold attached thereto from being tilted by applying a nozzle touch force. A connection part is mounted on a stationary platen via a connection pipe. The connection part is mounted on a connection mechanism via a block. A ball screw shaft as a nozzle touch drive mechanism is rotatably mounted on the connection mechanism. The block is adjusted for a mounting position thereof such that tilt in the stationary platen and a mold attached thereto is eliminated when the mold is attached to the stationary platen and a nozzle touch force is applied to the mold. The nozzle touch force prevents the stationary platen and the mold from being tilted.

16 Claims, 16 Drawing Sheets

1

INJECTION MOLDING MACHINE

CROSS-REFERENCE TO RELATED APPLICATION

The present application claims benefit of Japanese Patent Application No. 2009-286354, filed on Dec. 17, 2009, Japanese Patent Application No. 2010-123663, filed on May 31, 2010, and Japanese Patent Application No. 2010-258135, filed on Nov. 18, 2010, the content of which is incorporated herein by reference.

BACKGROUND OF THE INVENTION

1. Field of the Invention

The present invention relates, in general, to injection molding machines and, more particularly, to a nozzle touch mechanism of an injection molding machine.

2. Description of the Related Art

In an injection molding machine, when molten material is to be injected into a mold attached to a stationary platen as part of a mold clamping mechanism, typically an injection mechanism is moved toward the mold clamping mechanism; a nozzle of a heating cylinder mounted on a leading end of the injection mechanism is brought into contact (also referred to as "nozzle touch") with the mold attached to the stationary platen as part of the mold clamping mechanism; and, while the nozzle is made to apply pressure (also referred to as a "nozzle touch force"), the molten material is injected into the mold.

The injection mechanism therefore has a nozzle touch unit for applying the nozzle touch force to the stationary platen.

A known injection molding machine has a nozzle touch unit that includes a sliding section, mounted with an injection mechanism, for making the injection mechanism move and a driving section for moving the injection mechanism along the sliding section. The injection molding machine further includes a connection mechanism having a first end supported on a stationary platen and a second end supported on the driving section of the nozzle touch unit. The connection mechanism is supported on the stationary platen at at least two points that are disposed at symmetrical positions relative to a central axis of a nozzle. The nozzle touch force is thereby transmitted to the nozzle touch unit via the connection mechanism, which prevents the stationary platen and a mold attached to the stationary platen from being tilted by the nozzle touch force. (See, for example, JP-A-2001-38764)

SUMMARY OF THE INVENTION

Problems to be Solved by the Invention

No consideration is, however, given in the related art injection molding machine to tilt of the stationary platen that may occur when the mold is attached to the stationary platen. There may therefore be cases where the injection molding machine performs its operating steps, such as mold open/close, injection, dwelling, and cooling, with the stationary platen and the mold attached thereto in a tilted position.

It is an object of the present invention to provide an injection molding machine that can prevent a stationary platen and a mold attached thereto from being tilted for a period of time during which a nozzle touch force is being applied.

The "period of time during which a nozzle touch force is being applied" refers to a period of time, through which the following steps of a typical injection molding cycle S100 as shown in FIG. 16 are performed: start of a mold closing or clamping operation in a mold clamping step S101, an injection step S102, a dwelling step S103, a cooling step S104 and the completion of application of the nozzle touch force in a mold opening step S105.

Note herein that, in the mold clamping step S101, typically the mold is clamped. In an injection molding machine that uses a drive unit operated by any power source other than hydraulic pressure, such as an electric power, to close the mold and uses a hydraulic drive to clamp the mold, however, the mold clamping step S101 may be performed in two sub-steps of closing the mold (mold closing sub-step) and clamping the mold (mold clamping sub-step).

If the injection molding cycle S100 is performed continuously, specifically, if an injection molding operation is continuously performed, the nozzle touch force, once applied, may be continuously applied until a continuous operation of the injection molding cycle S100 is completed, instead of applying the nozzle touch force for each cycle, in order to shorten the injection molding cycle S100.

Means for Solving the Problem

To achieve the foregoing object, there is provided an injection molding machine. In an aspect of the present invention, the injection molding machine includes: a fixed stationary platen; a mold attached to the stationary platen; an injection mechanism capable of moving in a direction toward or away from the stationary platen; a nozzle disposed on the injection mechanism; a moving mechanism for moving the injection mechanism in the direction toward or away from the stationary platen; a drive mechanism, connected to a first end of the moving mechanism, for moving the injection mechanism via the moving mechanism to thereby apply pressure relative to the mold from the nozzle; a first connection mechanism connected to a second end of the moving mechanism; an object supported on the first connection mechanism; and a second connection mechanism supported on the first connection mechanism via the object and supported on the stationary platen.

In the aspect of the present invention, through mounting of a block (object) and application of the nozzle touch force, the stationary platen and the mold attached thereto can be prevented from being tilted while the nozzle touch force is being applied.

By mounting the block so as to be easily adjusted, the stationary platen and the mold attached thereto can be prevented from being tilted while the nozzle touch force is being applied according to the mold.

DETAILED DESCRIPTION OF THE PREFERRED EMBODIMENTS

A preferred embodiment of the present invention will be described below with reference to the accompanying drawings.

An arrangement of an injection molding machine according to a preferred embodiment of the present invention will be described below with reference to FIGS. 1 to 4.

Figure 1:
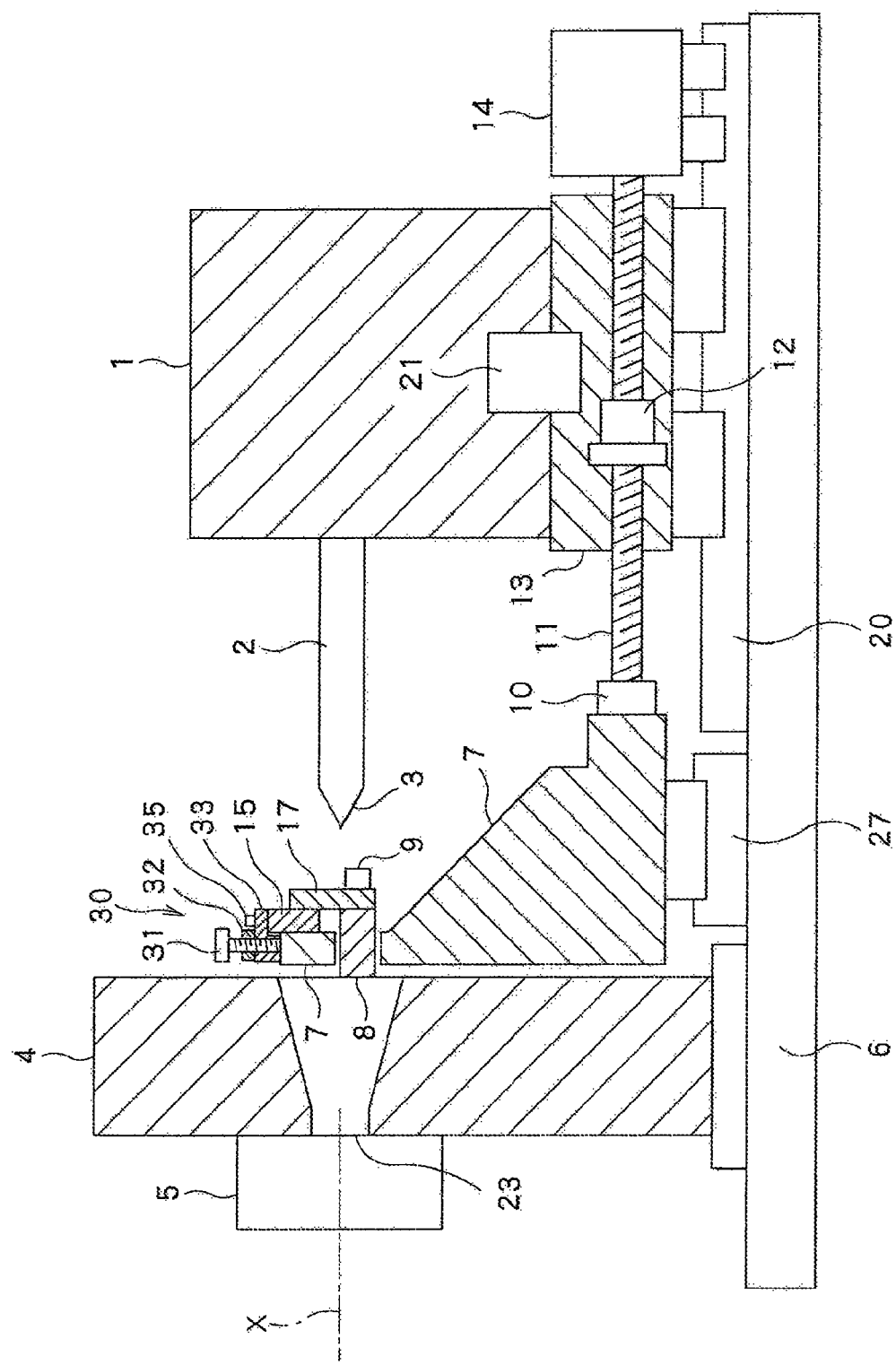
FIG. 1 is an explanatory view for illustrating a nozzle touch unit in a preferred embodiment of the present invention.

FIG. 1 is a schematic view showing an injection molding machine according to the preferred embodiment of the present invention.

Referring to FIG. 1, a stationary platen 4 is fixed on a base frame 6. A mold 5 is attached to the stationary platen 4.

The stationary platen 4 has a nozzle insertion hole 23 for allowing a nozzle 3 to be brought into contact with, and pressed against, a spool of the mold 5 attached to the stationary platen 4.

A connection pipe 8 is supported on the stationary platen 4 by a bolt 9.

Figure 2:
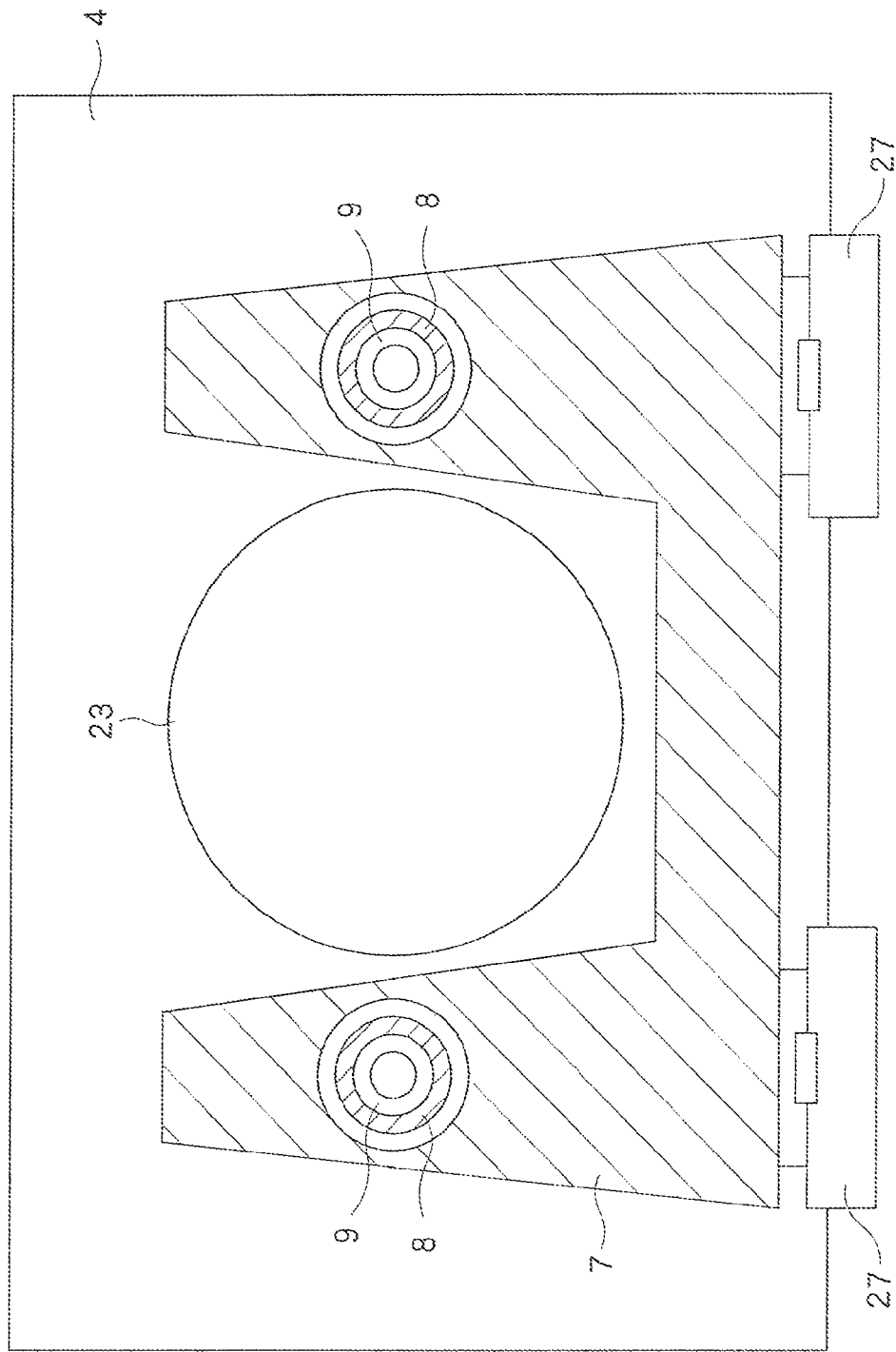
FIG. 2 is an explanatory view for illustrating a relation between a connection mechanism and a connection pipe in the preferred embodiment of the present invention.

The connection pipe 8 is not in contact with a connection mechanism 7 as shown in FIGS. 1 and 2. The connection mechanism 7 is not in contact with the stationary platen 4, either, as shown in FIG. 1. Specifically, the connection mechanism 7 is not connected to the stationary platen 4 with a space formed therebetween. (The connection mechanism 7 is also referred to as a first connection mechanism).

The stationary platen 4 supports a connection part 17 via the connection pipe 8 by the bolt 9. The connection part 17 is also referred to as a second connection mechanism).

In addition, the connection part 17 is supported on the connection mechanism 7 via a block 15 (object).

A supporting point, at which the connection mechanism supports the block 15, is in a position disposed upwardly of an axis X (or a center of the nozzle 3) that extends horizontally relative to the base frame 6 and passes through a center of the nozzle insertion hole 23.

A mounting position of the block 15 can be adjusted in a Z-axis direction relative to the connection mechanism 7, specifically, in a direction perpendicular to the base frame 6.

Figure 3:
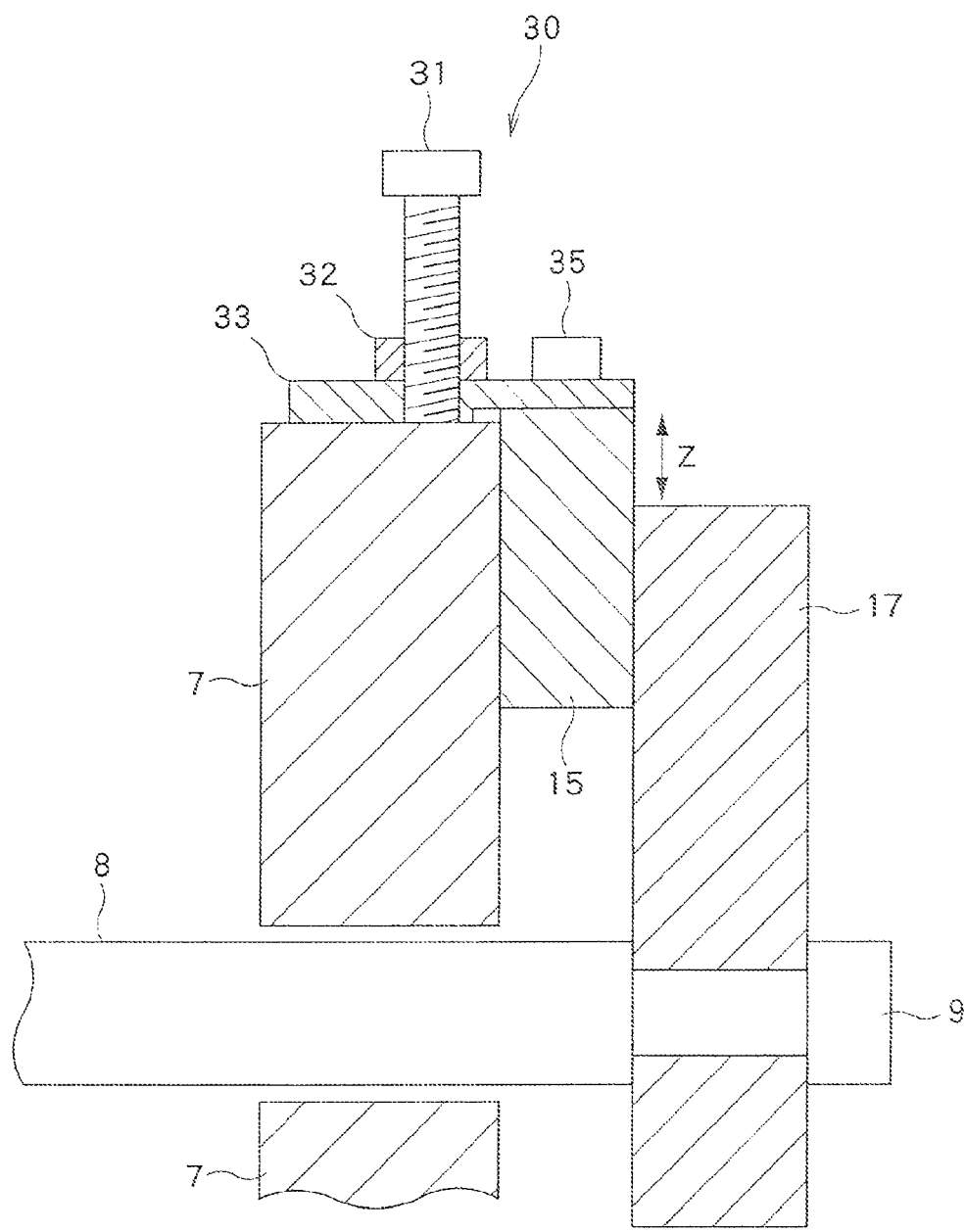
FIG. 3 is an enlarged explanatory view for illustrating adjustments of a position of a block in the preferred embodiment of the present invention by using a jack.
Figure 4:
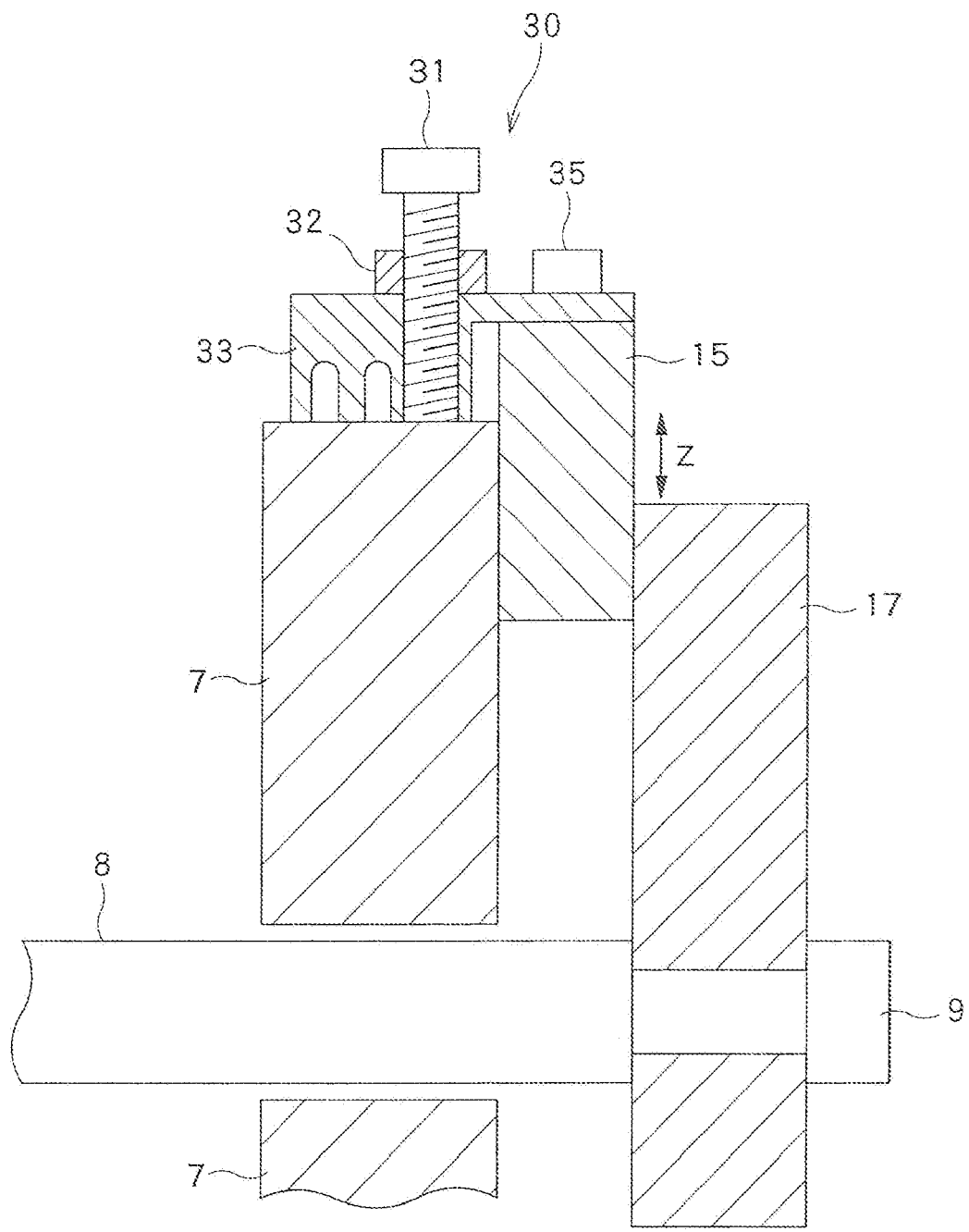
FIG. 4 is an enlarged explanatory view for illustrating a condition in which the block is raised with the jack shown in FIG. 3 relative to a condition shown in FIG. 3.

Referring to FIGS. 3 and 4, the mounting position of the block 15 can be adjusted by mounting an elevator, such as a jack 30 (screw-operated), on the connection mechanism 7 and operating the jack 30.

Specifically, the jack 30 as an example of the elevator is mounted on the connection mechanism 7 and an adjusting bracket 33 that forms part of the jack 30 is connected to the block 15 with a bolt 35.

The jack 30 is operated for, for example, raising to move the block 15 in the Z-axis direction, specifically, perpendicularly relative to the base frame 6 to thereby adjust the mounting position of the block 15.

A conventional art of the screw-operated jack will be used for operating the jack 30 at this time and detailed descriptions for the same will be omitted.

A bearing unit 10 is fixed to the connection mechanism 7. The bearing unit 10 supports a ball screw shaft 11 rotatably but axially immovably.

The connection mechanism 7 is supported on the base frame 6 so as to be reciprocatingly movably in a direction toward or away from the stationary platen 4 along a guide rail 27 (guideway mechanism) disposed on the base frame 6.

The connection mechanism 7 is thereby prevented from being raised relative to the base frame 6. The ball screw shaft 11 is also thereby inhibited from being bent.

The ball screw shaft 11 supported by the bearing unit 10 has a distal end connected to a motor 14 (drive mechanism).

The ball screw shaft 11 is threadedly engaged with a nut 12 that is unrotatable.

The nut 12 is mounted inside a base 13.

The base 13 is adapted to be reciprocatingly movable in the direction toward or away from the stationary platen 4 along a guide rail 20 disposed on the base frame 6.

An injection mechanism 1 is placed on the base 13. The injection mechanism 1 and the base 13 are connected together with a pin 21 that serves as a swivel axis. The injection mechanism 1 is movable in the direction toward or away from the stationary platen 4 relative to the base frame 6.

The ball screw shaft 11 (moving mechanism) and the nut 12 that together move the injection mechanism 1 in the direction toward or away from the stationary platen 4 are disposed on the base frame 6. The motor 14 is connected to the distal end of the ball screw shaft 11.

The motor 14 moves the injection mechanism 1 via the bail screw shaft 11 and the nut 12 to thereby apply pressure from the nozzle 3 to the mold 5. The motor 14 is either movably disposed on the guide rail 20 or mounted on the base 13 so as to be horizontally movable relative to the base frame 6.

The injection mechanism 1 is adapted, by energizing the motor 14, to be reciprocatingly movable with the base 13 in the direction toward or away from the stationary platen 4 via the ball screw shaft 11 and the nut 12, and swiveled on the base 13 about the pin 21.

The injection mechanism 1 is mounted with a heating cylinder 2 that faces the stationary platen 4. The nozzle 3 is disposed at a leading end of the heating cylinder 2.

Operation of the injection molding machine according to the preferred embodiment of the present invention will be described below.

First, the stationary platen 4 is placed perpendicularly on the base frame 6 with the mold 5 not attached to the stationary platen 4.

Next, the mold 5 is attached to the stationary platen 4.

Then, using the jack 30 (elevator), the mounting position of the block 15 relative to the connection mechanism 7 is adjusted according to the mold 5.

The mounting position of the block 15 relative to the connection mechanism 7 is adjusted at this time such that the stationary platen 4 is perpendicular to the base frame 6 when the nozzle touch force is applied.

With the mold 5 attached to the stationary platen 4, the stationary platen 4 is not perpendicular to the base frame 6 and is tilted toward the mold 5 due to a weight of the mold 5.

Figure 16:
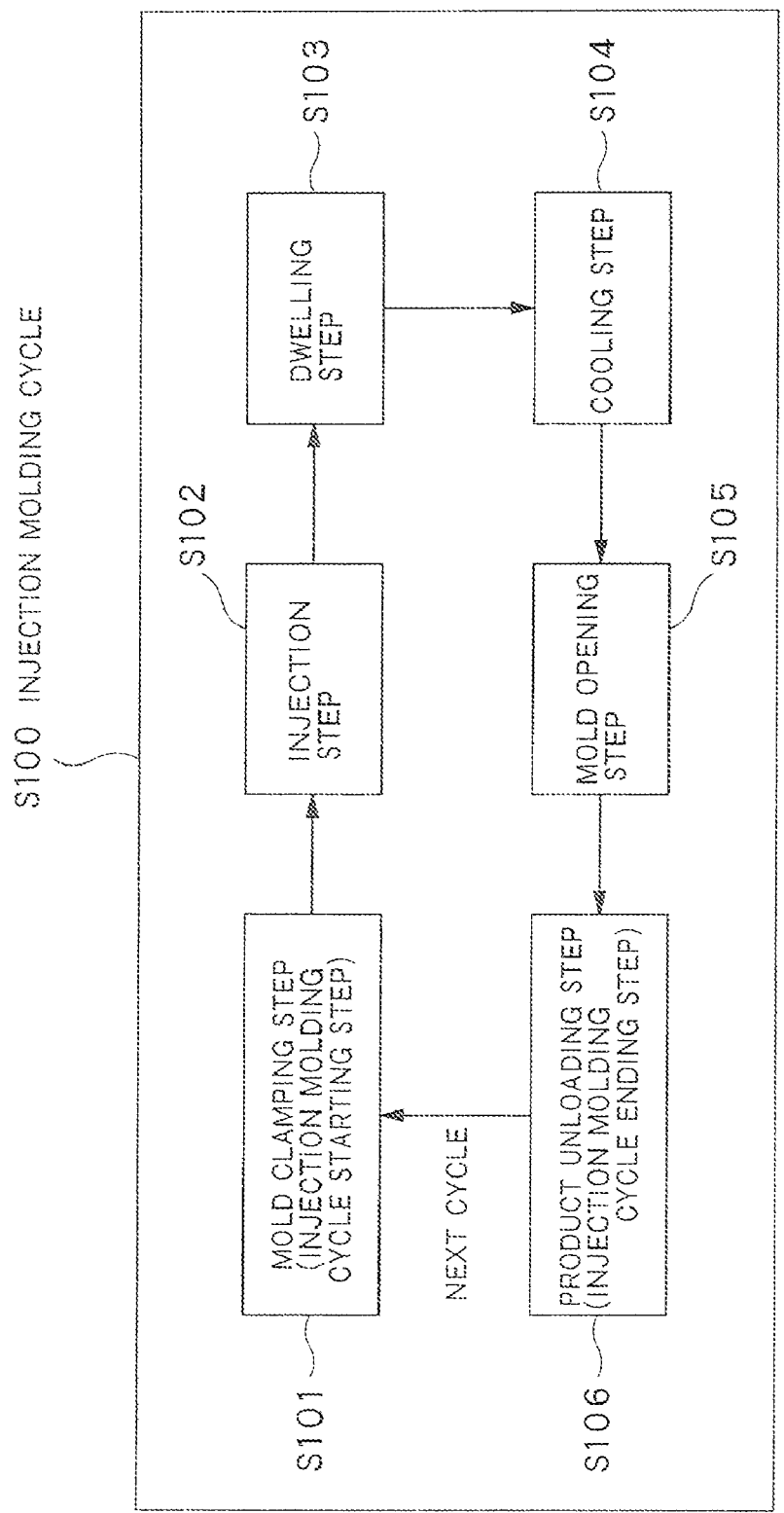
FIG. 16 is an explanatory diagram showing a typical injection molding cycle.

The stationary platen 4 is brought into a position perpendicular to the base frame 6 by application of the nozzle touch force during a mold clamping step S101 (see FIG. 16).

Specifically, in the mold damping step S101, the motor 14 driven so as to advance the injection mechanism 1.

The injection mechanism 1 advances when the injection mechanism 1 moves in a direction of approaching the stationary platen 4.

This results in the ball screw shaft 11 being rotate The rotation of the ball screw shaft 11 causes the unrotatable nut 12 to move in the direction of approaching the stationary platen 4.

The injection mechanism 1 thereby advances toward the stationary platen 4.

As a result, the nozzle 3 at the leading end of the heating cylinder 2 mounted on the injection mechanism 1 contacts, and then presses the mold 5, which generates the nozzle touch force.

The pressing nozzle touch force is generated by a force of the ball screw shaft 11 pulling the connection mechanism 7.

Specifically, the connection mechanism 7 is pulled by the nozzle touch force toward the injection mechanism 1 via the ball screw shaft 11.

In addition, since the block 15 and the connection part 17 are supported on the connection mechanism 7, the block 15 and the connection part 17 are also pulled by the nozzle touch force toward the injection mechanism 1.

Since the connection part 17 is supported on the stationary platen 4 via the connection pipe 8, therefore, the nozzle touch force causes moment to act on the stationary platen 4 to pull the stationary platen 4 toward the injection mechanism 1.

A point of force of the moment to pull the stationary platen 4 toward the injection mechanism 1 at this time depends on the mounting position of the block 15 (the supporting point at which the connection mechanism 7 supports the block 15).

Additionally, since the mold 5 is attached to the stationary platen 4, moment to pull the stationary platen 4 toward the mold 5 is generated by the nozzle touch force applied to the mold 5. This moment has a point of force at the central axis of the nozzle insertion hole 23.

Note here that a fulcrum of the moment applied to the stationary platen 4 is a bottom surface of the stationary platen 4.

The supporting point, at which the connection mechanism 7 supports the block 15, is in a position disposed upwardly of the axis X that extends horizontally relative to the base frame 6 and passes through the center of the nozzle insertion hole 23. Therefore, the moment by the nozzle touch force generated by the force of the ball screw shaft 11 to pull the connection mechanism 7 is greater than the moment by the nozzle touch force applied to the mold 5 by a margin corresponding to the supporting point which is in a position disposed upwardly of the axis X that extends horizontally relative to the base frame 6 and passes through the center of the nozzle insertion hole 23.

The stationary platen 4 is therefore tilted toward the injection mechanism 1.

When the stationary platen 4 becomes perpendicular to the base frame 6, the moment by the nozzle touch force generated by the force of the ball screw shaft 11 to pull the connection mechanism 7 becomes equal to the moment by the nozzle touch force applied to the mold 5.

Specifically, when the stationary platen 4 becomes perpendicular to the base frame 6, moment to tilt the stationary platen 4 toward the mold 5 becomes equal to moment to tilt the stationary platen 4 toward the injection mechanism 1.

As a result, the stationary platen 4 no longer tilts toward the injection mechanism 1.

Specifically, the stationary platen 4 maintains a perpendicular position relative to the base frame 6.

Therefore, the stationary platen 4 becomes perpendicular to the base frame 6 by the application of the nozzle touch force thereto and the mold 5 attached to the stationary platen 4 also becomes perpendicular to the base frame 6.

The stationary platen 4 and the mold 5 attached thereto maintain a position perpendicular to the base frame 6 for a subsequent period of time that covers from the start of a mold closing or clamping operation in a mold clamping step S101 (see FIG. 16), an injection step S102, a dwelling step S103, and a cooling step S104, to the completion of application of the nozzle touch force in a mold opening step S105.

If an injection molding cycle S100 is performed continuously, specifically, if an injection molding operation is continuously performed, the stationary platen 4 and the mold 5 attached thereto may maintain a position perpendicular to the base frame 6 for a period of time that covers from the start of a mold closing or clamping operation in the first mold clamping step S101 of the continuous injection molding cycle S100 to the completion of the continuous operation of the injection molding cycle S100, specifically, to the completion of application of the nozzle touch force in the mold opening step S105 at the end of the continuous operation of the injection molding cycle S100.

Effects of the injection molding machine according to the preferred embodiment of the present invention will be described below.

In the injection molding machine according to the preferred embodiment of the present invention, by the mounting of the block 15 and the application of the nozzle touch force, the stationary platen 4 and the mold 5 attached thereto can be prevented from being tilted while the nozzle touch force is being applied.

By making the connection mechanism 7 support the block 15 such that the block 15 can be easily adjusted according to the mold 5, the stationary platen 4 and the mold 5 attached thereto can be prevented from being tilted while the nozzle touch force is being applied.

The stationary platen 4 and the mold 5 attached thereto being prevented from being tilted while the nozzle touch force is being applied result in the stationary platen 4 maintaining a perpendicular position relative to the base frame 6 during mold opening/closing, so that, for example, the mold 5 and a guide pin thereof can be prevented from being damaged.

Figure 5:
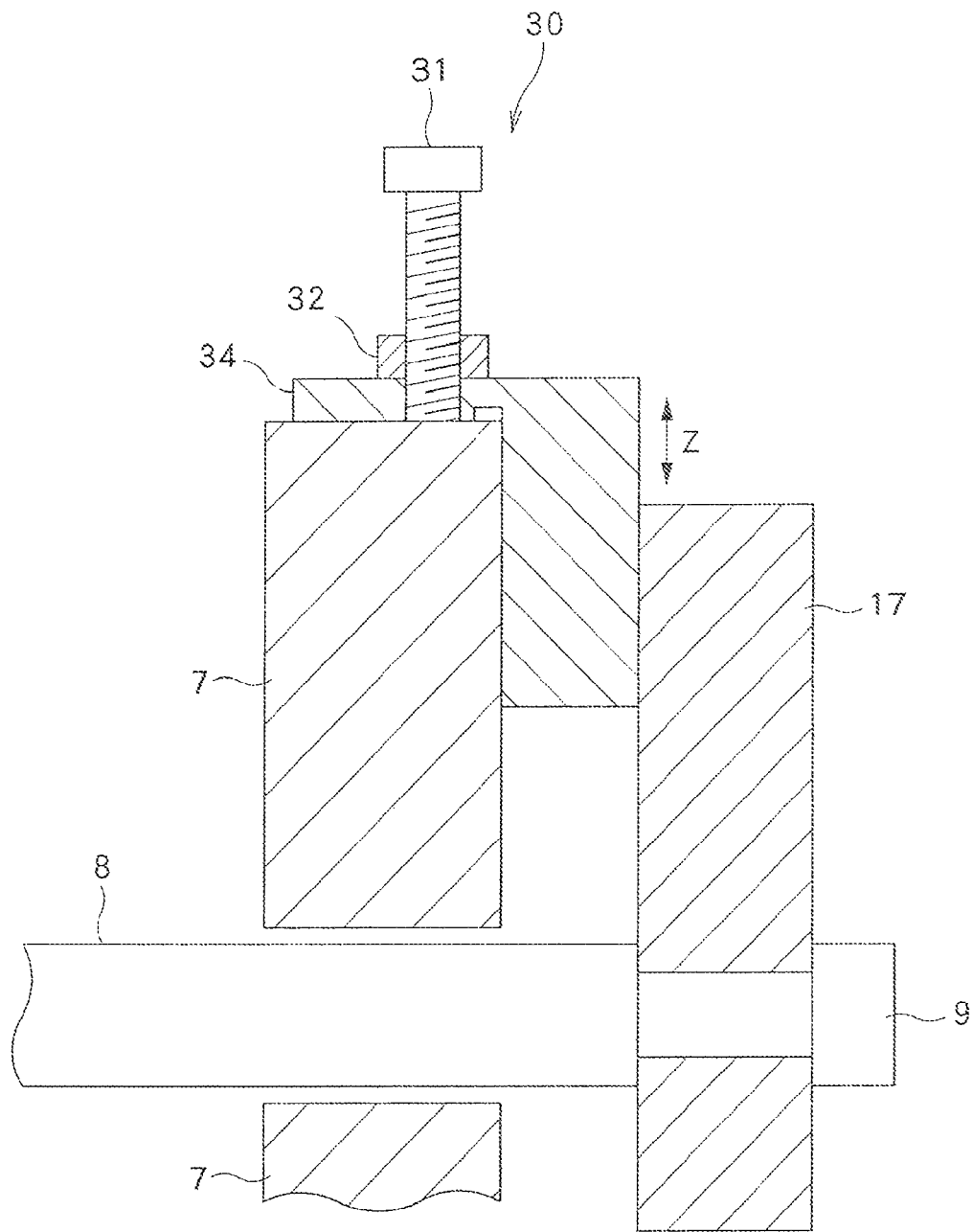
FIG. 5 is an enlarged explanatory view for illustrating an adjusting bracket that forms part of the jack and the block shown in FIGS. 3 and 4, integrated with each other.

As the elevator, instead of using the jack 30 shown in FIG. 3 or 4, one shown in FIG. 5 may be used. Referring to FIG. 5, a block 34 integrates the adjusting bracket 33 as a component of the elevator, such as the jack 30 shown in FIG. 3 or 4, with the block 15. A mounting position of the block 34 may be adjusted by moving the block 34 in the Z-axis direction, specifically, in a direction perpendicular to the base frame 6 through the operation of the elevator, such as the jack 30.

Referring to FIGS. 3, 4, and 5, several methods are known for operating the (screw-operated) jack 30. Known types of jack according to the operating methods include a standard screw jack, a ratchet screw jack, and a bearing screw jack. Any of these known types may be used for the present invention.

The jack 30 shown in FIGS. 3, 4, and 5 is operated by a screw; however, the screw is not the only possible means for operating the jack 30 according to the present invention. For example, hydraulic, pneumatic, rack-driven, or any other operating means may be used as the means for operating the jack 30.

Specifically, the present invention is not concerned with any specific means for moving the block 15 or the block 34 in the Z-axis direction, specifically, in the direction perpendicular to the base frame 5 by using the jack 30.

In addition, in FIGS. 3, 4, and 5, the jack is used as the elevator; however, the jack is not the only possible means as the elevator. Specifically, any means may be used as the elevator, as long as the connection mechanism 7 can be mounted with the means and the means can move the block 15 or the block 34 in the Z-axis direction, specifically, in the direction perpendicular to the base frame 6.

In the injection molding machine according to the preferred embodiment of the present invention described heretofore, the block 15 is a cube as shown in FIG. 1; however, the block 15 may not have to be a cube and the block 15 may, for example, be a cuboid.

The block 15 may therefore take various shapes.

FIGS. 6 through 10 are illustrations showing an injection molding machine according to a modified example of the preferred embodiment of the present invention. In FIGS. 6 through 10, like parts are identified by the same reference numerals as those used in FIGS. 1 through 5.

In FIGS. 6 through 10, a connection part 17 (second connection mechanism) is supported on a connection mechanism 7 (first connection mechanism) via a block 15 (object) with a bolt 16.

The supporting point, at which the connection mechanism 7 supports the block 15, is in a position disposed upwardly of an axis (or a center of a nozzle 3) that passes through a center of a nozzle insertion hole 23 and extends horizontally relative to a base frame 6.

Figure 8:
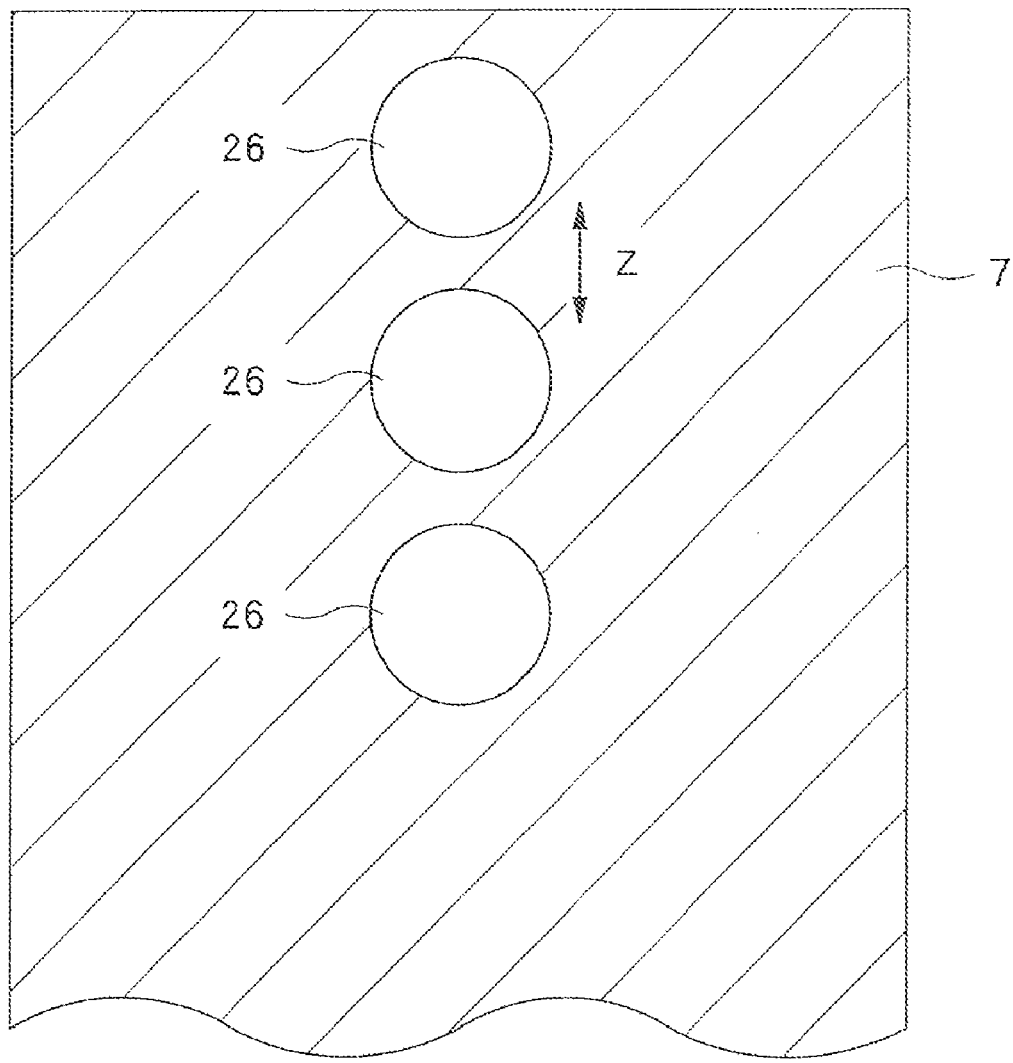
FIG. 8 is an enlarged explanatory view for illustrating an arrangement of threaded holes for bolts in the connection mechanism in the modified example of the preferred embodiment of the present invention.

In addition, referring to FIG. 8, the connection mechanism 7 has a plurality of threaded holes 26 for a plurality of bolts 16 arrayed in a Z-axis direction, specifically, a direction perpendicular to the base frame 6. The threaded holes 26 are disposed upwardly of the axis that passes through the center of the nozzle insertion hole 23 and extends horizontally relative to the base frame 6.

Figure 9:
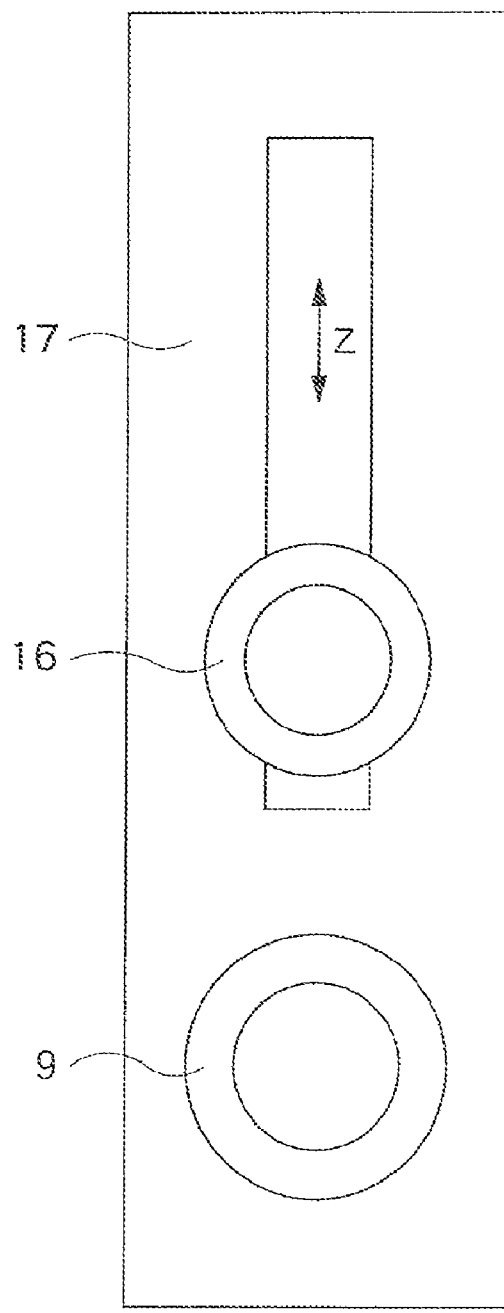
FIG. 9 is an explanatory view for illustrating a connection part that enables an adjustment of a mounting position of a bolt using one bolt hole in the modified example of the preferred embodiment of the present invention.
Figure 10:
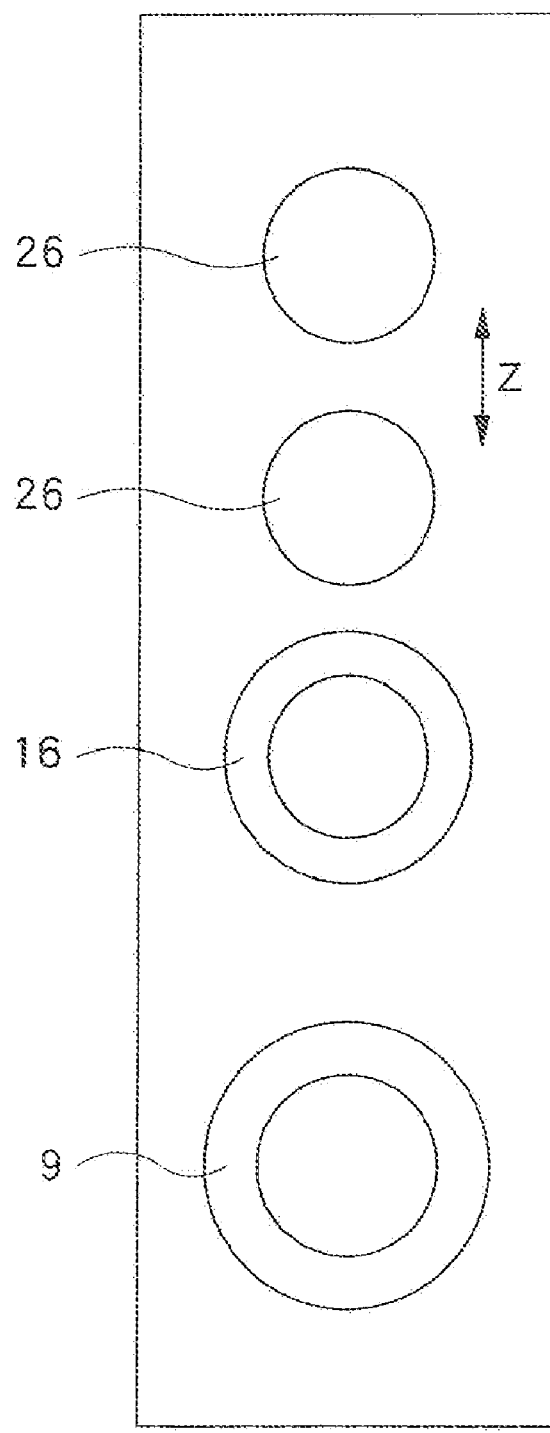
FIG. 10 is an explanatory view for illustrating a connection part that enables an adjustment of a mounting position of a bolt using a plurality of bolt holes in the modified example of the preferred embodiment of the present invention.

In addition, referring to FIG. 9, the connection part 17 has a hole made for allowing the bolt 16 to be reciprocatingly movable in the Z-axis direction, specifically, the direction perpendicular to the base frame 6.

Referring to FIG. 9, the bolt 16 can thereby be installed so as to be reciprocatingly movable on the connection part 17 in the Z-axis direction, specifically, the direction perpendicular to the base frame 6.

Consequently, the block 15 and the bolt 16 can be adjusted for mounting positions relative to the connection mechanism 7 in the Z-axis direction, specifically, the direction perpendicular to the base frame 6.

Figure 6:
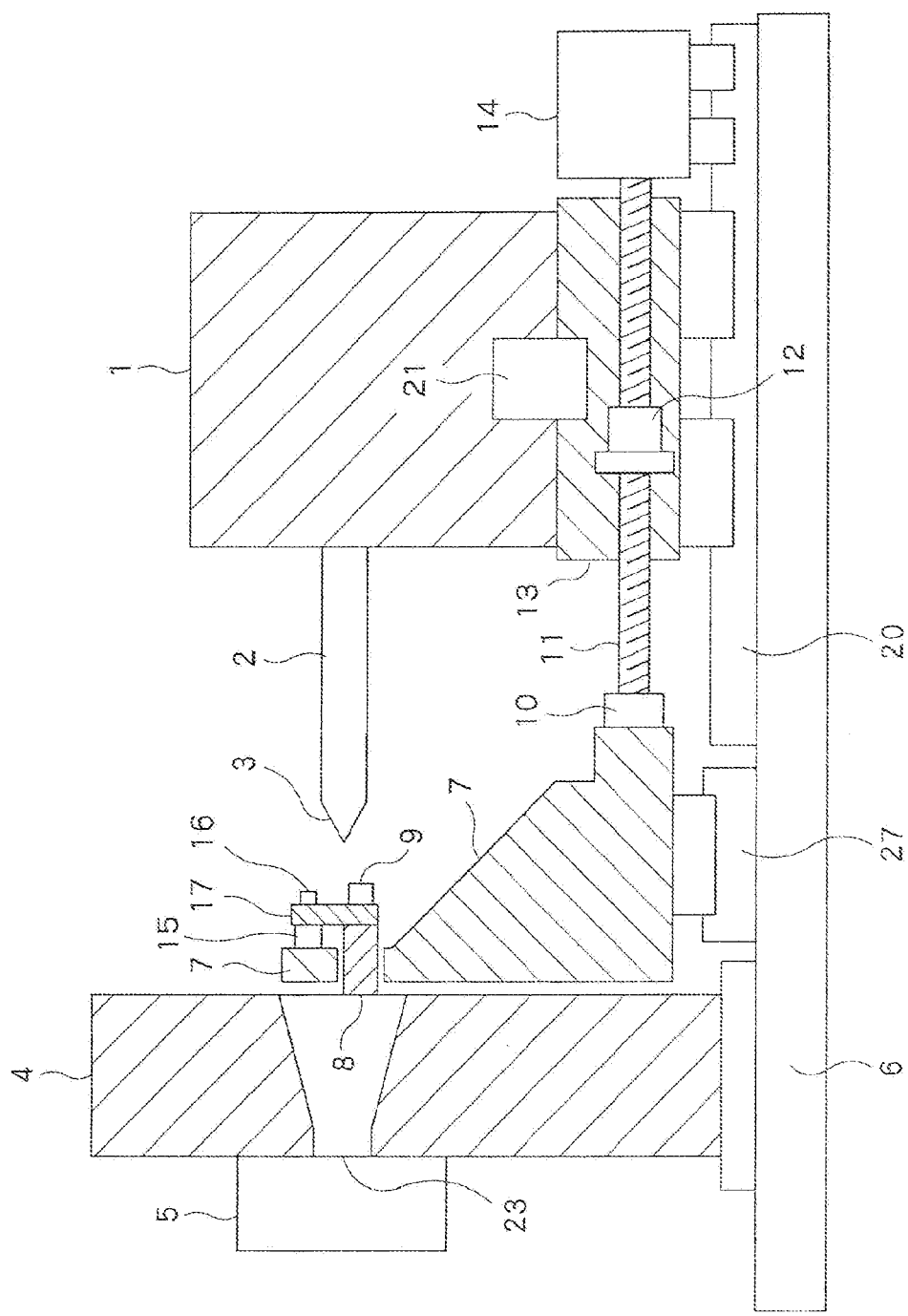
FIG. 6 is an explanatory view for illustrating a nozzle touch unit in a modified example of the preferred embodiment of the present invention.
Figure 7:
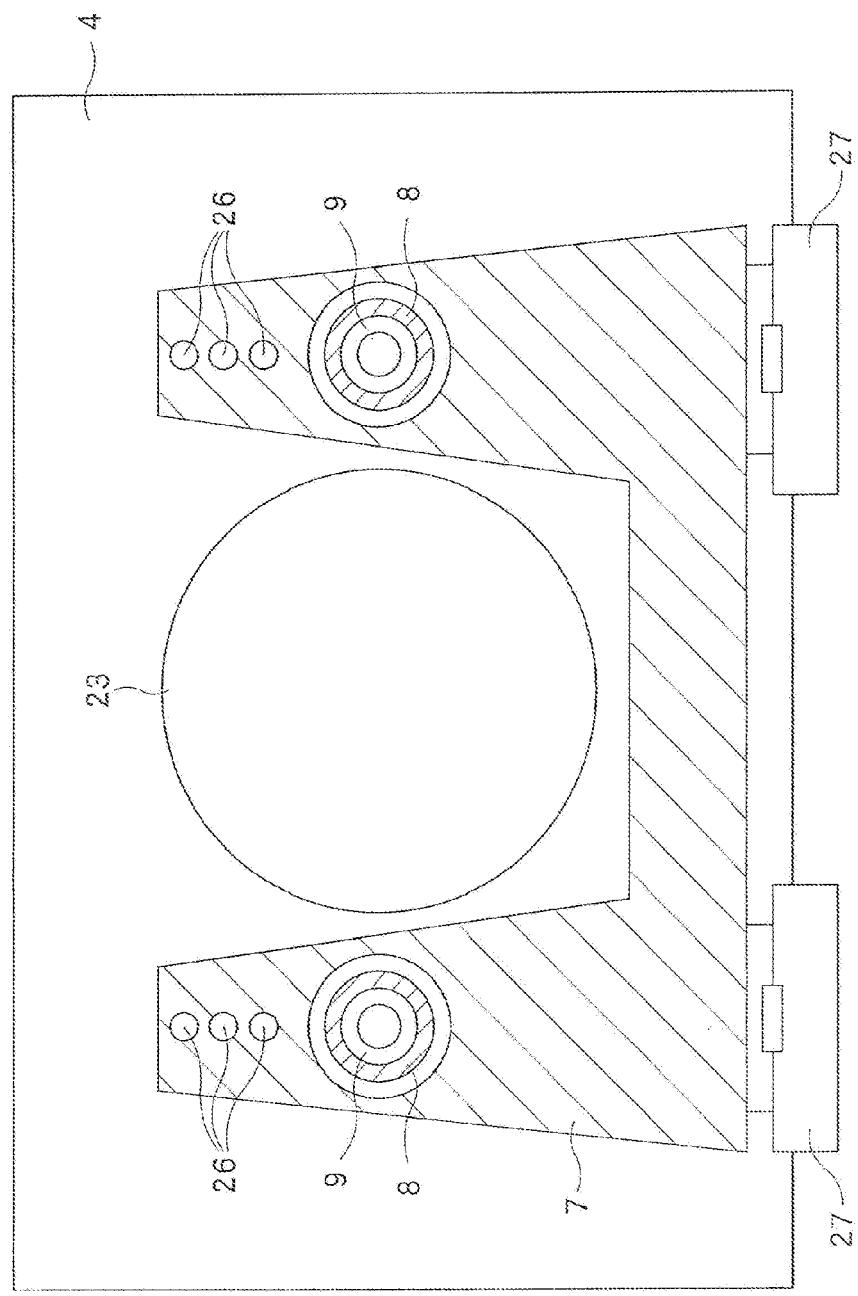
FIG. 7 is an explanatory view for illustrating a relation between a connection mechanism and a connection pipe in the modified example of the preferred embodiment of the present invention.

Referring to FIG. 6, the connection mechanism 7 is not in contact with a stationary platen 4 with a space formed therebetween. In this respect, the modified example of the preferred embodiment of the present invention is arranged in the same manner as in the preferred embodiment of the present invention shown in FIGS. 1 through 5.

Additionally, referring to FIG. 9, the connection part 17 has a single hole, in which the bolt 16 can be moved and adjusted for a mounting position thereof in the Z-axis direction, specifically, the direction perpendicular to the base frame 6. The shape of the hole is not, however, limited only to the one shown in FIG. 9. For example, referring to FIG. 10, the connection part 17 may have a plurality of threaded holes 26 for a plurality of bolts 16 in the same manner as in the connection mechanism 7, to thereby allow the mounting position of the bolt 16 to be adjusted.

Accordingly, various methods are conceivable and any of those methods may be employed to allow the mounting position of the bolt 16 to be adjusted in the connection part 17.

Figure 11:
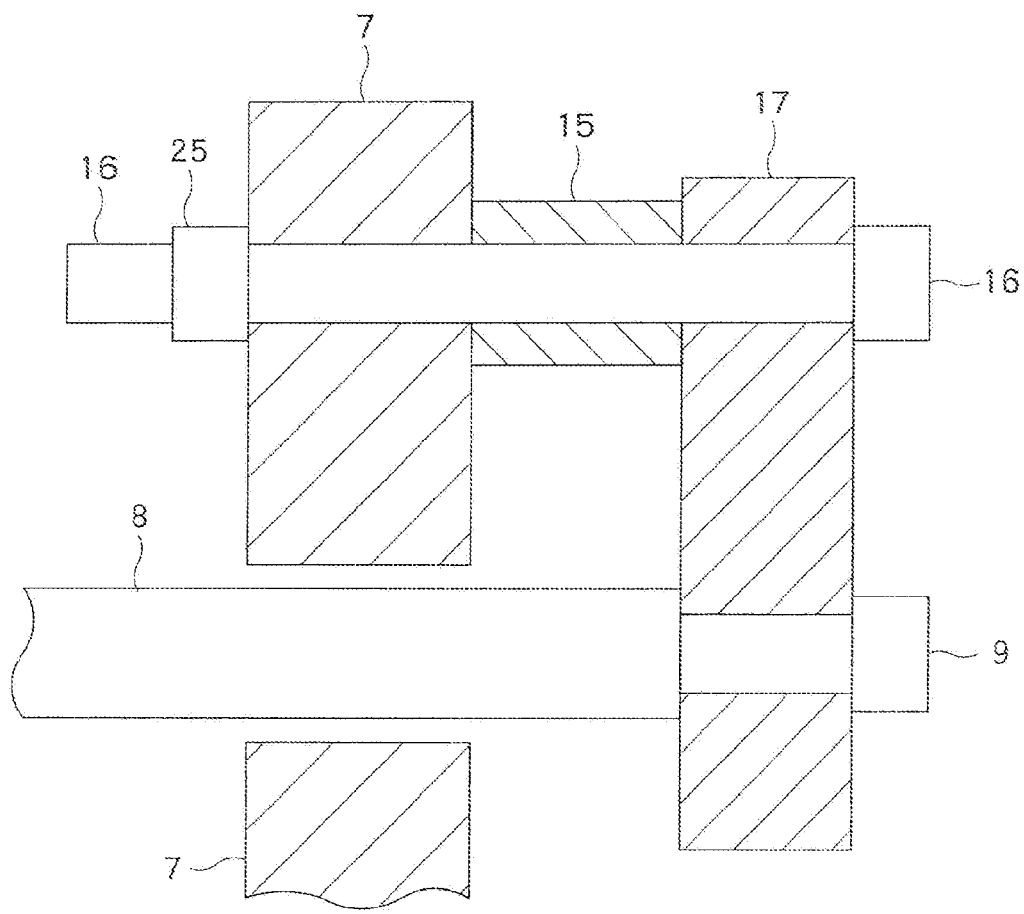
FIG. 11 is an enlarged explanatory view for illustrating a method of mounting a block and the connection part on the connection mechanism in the modified example of the preferred embodiment of the present invention.

As a method of supporting the block 15 and the connection part 17 on the connection mechanism 7, instead of using only the bolt 16 as shown in FIG. 6, another method may be employed. Specifically, referring to FIG. 11, the bolt 16 is passed through the connection part 17, the block 15, and the connection mechanism 7 and a leading end of the bolt 16 is tightened with a nut 25.

Accordingly, various methods are conceivable and any of those methods may be employed to support the block 15 and the connection part 17 on the connection mechanism 7.

Figure 12:
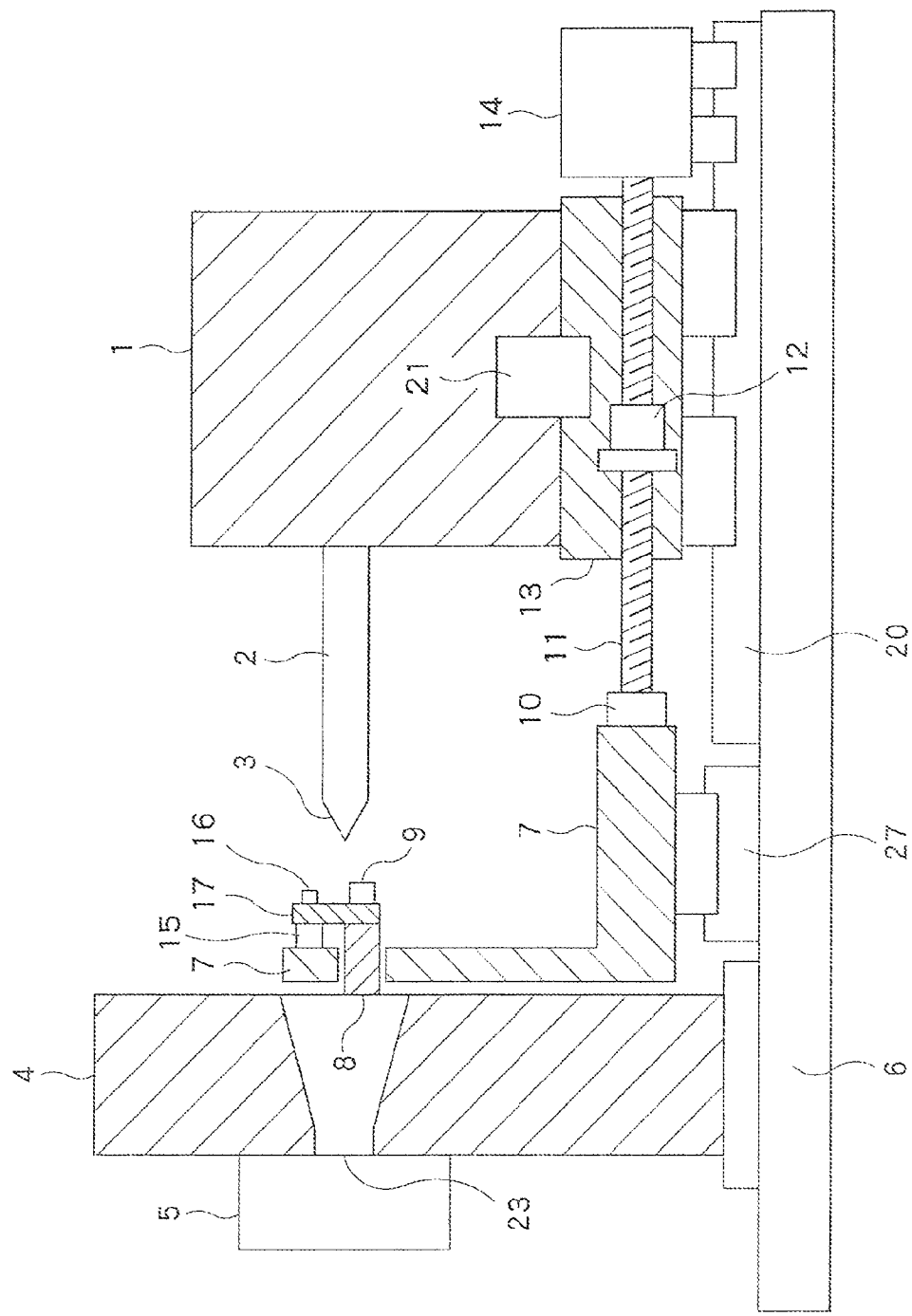
FIG. 12 is an explanatory view for illustrating the connection mechanism formed into an L shape in the nozzle touch unit in the injection molding machine according to the preferred embodiment of the present invention.

Referring to FIGS. 1 and 6, the connection mechanism 7 is formed into a trapezoid-like shape. The trapezoidal shape is not, however, the only possible shape. The connection mechanism 7 may still be formed into an L-shape as shown in FIG. 12, a U-shape, a recessed shape, an I-shape, or a T-shape turned sideways.

The threaded holes 26 for the bolts 16 that allow the position of the connection mechanism 7 for supporting the block and the connection part 17 to be adjusted may not necessarily be disposed at predetermined intervals as shown in FIG. 8. The threaded holes 26 for the bolts 16 may be spaced apart from each other at regular or irregular intervals.

The connection mechanism 7 may therefore be formed into any shape and the plurality of threaded holes 26 for the bolts 16 in the connection mechanism 7 may be spaced apart from each other at any intervals.

Figure 13:
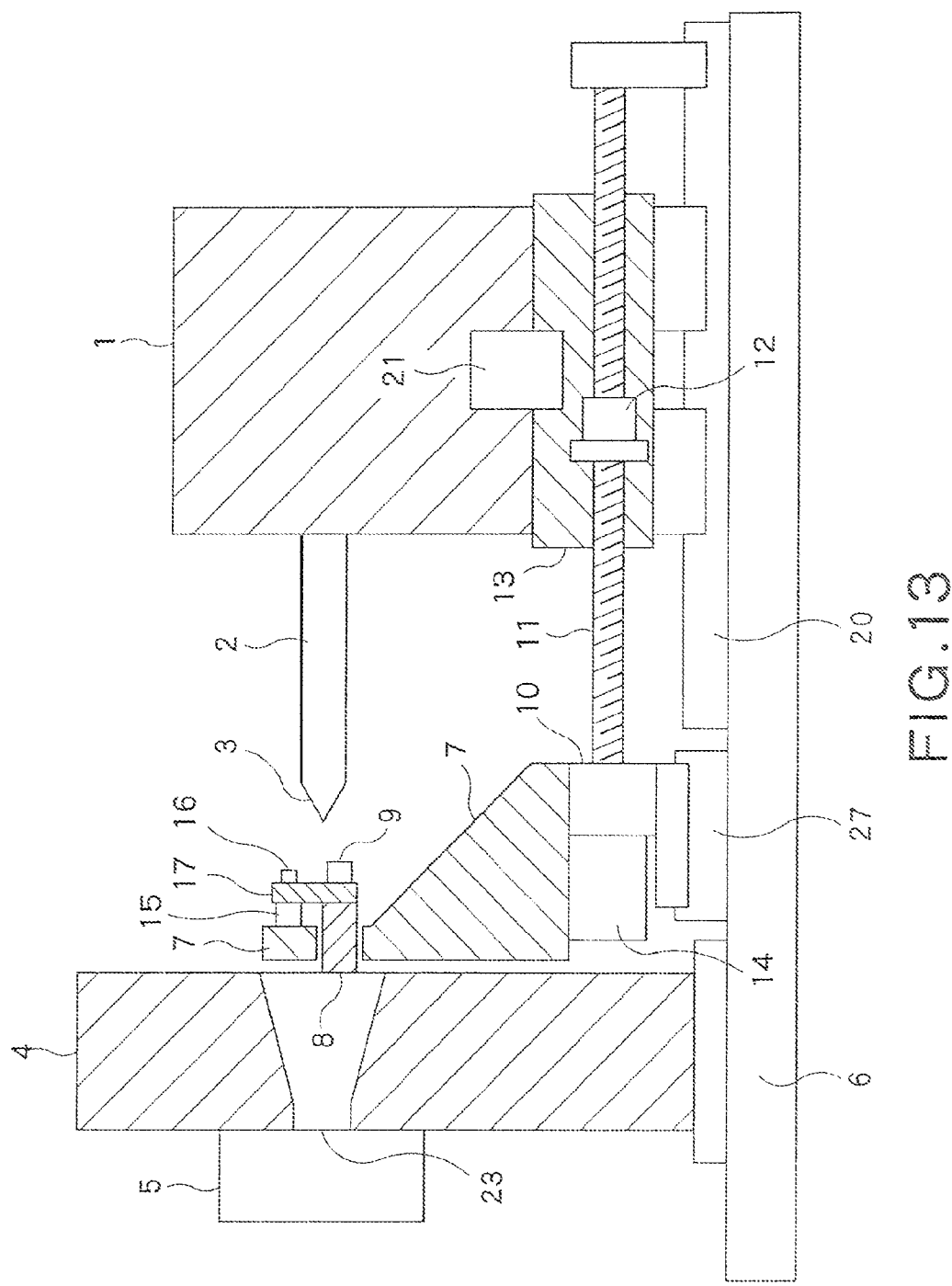
FIG. 13 is an explanatory view for illustrating mounting of a motor section on the connection mechanism in the nozzle touch unit in the injection molding machine according to the preferred embodiment of the present invention.

The motor 14 may be disposed on, instead of the side of the injection mechanism 1 as shown in FIGS. 1 and 6, the side of the connection mechanism 7 as shown in FIG. 13.

Accordingly, the motor 14 has a first end connected to the connection mechanism 7 via a bearing unit 10 or a ball screw shaft 11 and is disposed downwardly of the injection mechanism 1.

Figure 14:
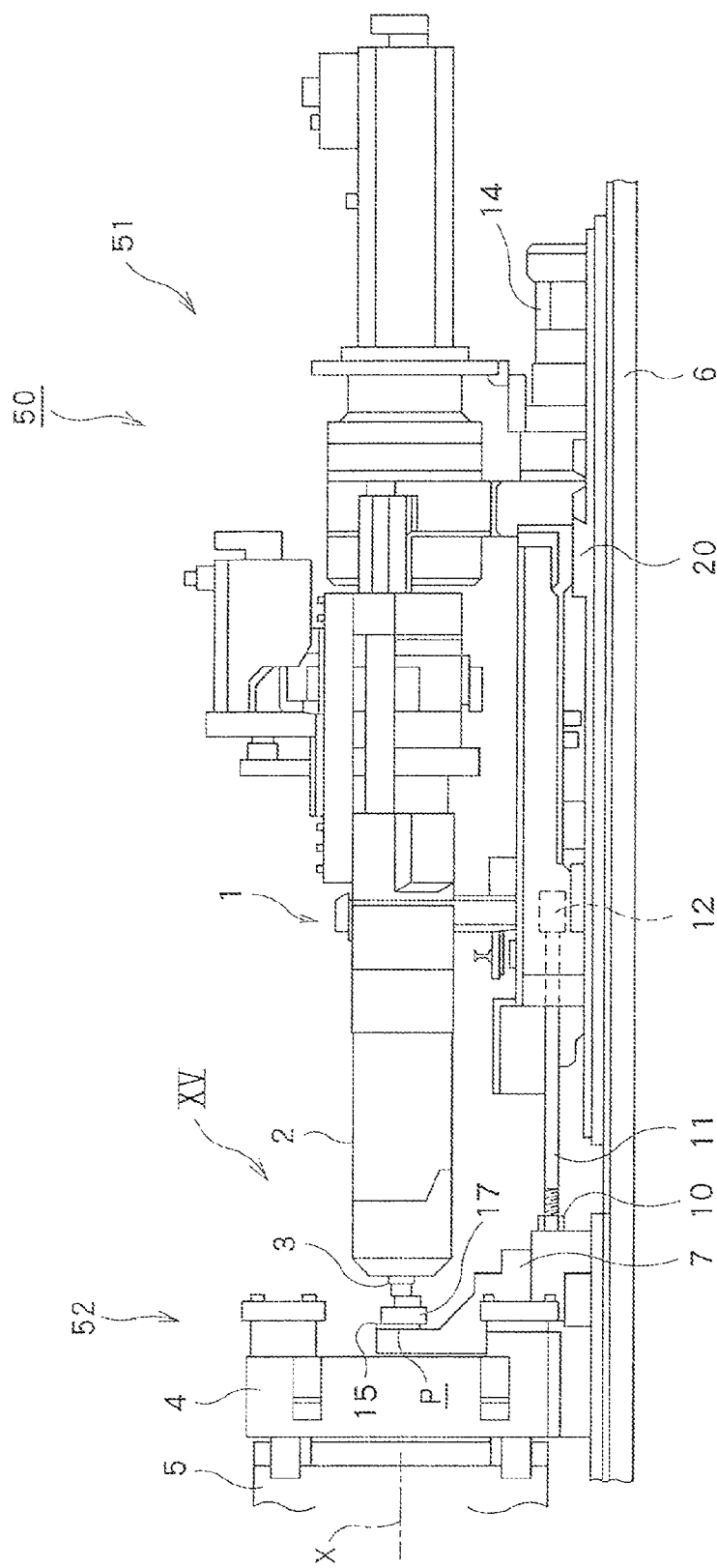
FIG. 14 is a side elevational view showing components of the injection molding machine according to the preferred embodiment of the present invention.
Figure 15:
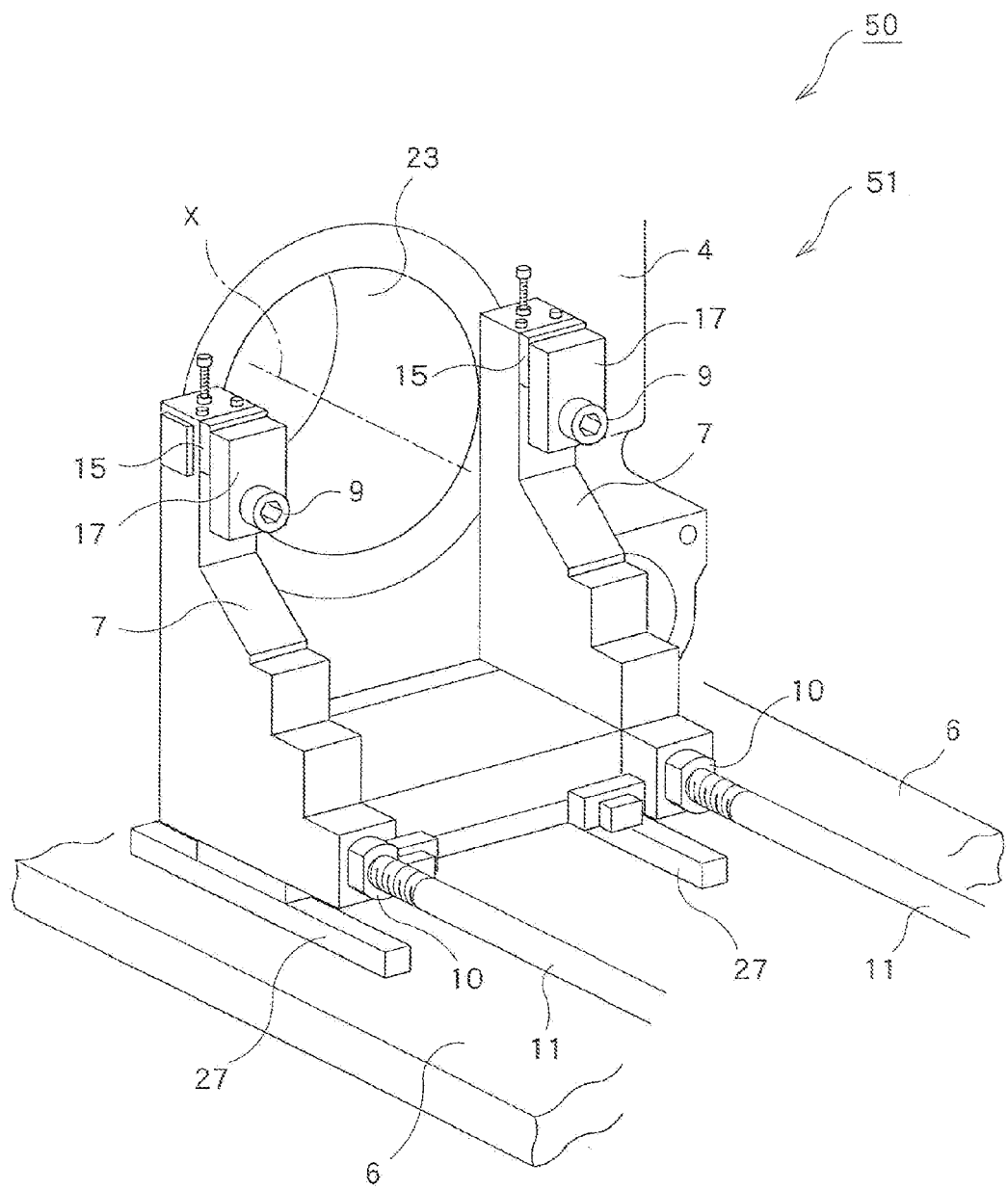
FIG. 15 is a perspective view on arrow XV in FIG. 14.

FIGS. 14 and 15 are illustrations showing further details of arrangements of the injection molding machine according to the preferred embodiment of the present invention. FIG. 14 is a side elevational view showing part of an injection section 51 (injection device) and a mold clamping section 52 (mold clamping device) of an injection molding machine 50. FIG. 15 is a perspective view on arrow XV in FIG. 14. In FIGS. 14 and 15, like parts are identified by the same reference numerals as those used in FIGS. 1 through 13.

Referring to FIGS. 14 and 15, the injection molding machine 50 includes the injection section 51 and the mold damping section 52 disposed on the base frame 6. Of these components, the mold clamping section 52 includes at least the stationary platen 4 fixed perpendicularly on the base frame 6 and the mold 5 (mainly a stationary mold half) attached to the stationary platen 4.

The injection section 51 is disposed on the base frame 6 and includes the injection mechanism 1 that is horizontally movable in the direction toward or away from the stationary platen 4. Specifically, the guide rail 20 is fixed on the base frame 6 and the injection section 51 and the injection mechanism 1 are capable of moving along the guide rail 20 on the base frame 6.

The injection mechanism 1 has the heating cylinder 2 that protrudes toward the side of the stationary platen 4. The nozzle 3 is disposed at the leading end of the heating cylinder 2.

The ball screw shaft 11 (moving mechanism) and the nut 12 for guiding and moving the injection mechanism 1 in the direction toward or away from the stationary platen 4 are disposed on the base frame 6.

The ball screw shaft 11 has a first end connected to the motor 14 (drive mechanism). The motor 14 moves the injection mechanism 1 via the ball screw shaft 11 and the nut 12 to thereby apply pressure to the mold 5 from the nozzle 3.

In addition, the ball screw shaft 11 has a second end connected to the connection mechanism 7 (first connection mechanism). The connection mechanism 7 supports the block (object), via which the connection part 17 (second connection mechanism) is supported on the connection mechanism 7. The connection part 17 is also supported on the stationary platen 4.

The stationary platen 4 has the nozzle insertion hole 23, through which the nozzle 3 passes when the nozzle 3 contacts, and applies pressure to, the spool of the mold 5.

In this case, the supporting point P, at which the connection mechanism 7 supports the block 15, is in a position disposed upwardly of an axis X (or the center of the nozzle 3) that passes through the center of the nozzle insertion hole 23 and extends horizontally relative to the base frame 6.

In FIGS. 14 and 15, as means of adjusting the mounting position of the block 15 relative to the connection mechanism 7, the jack 30 (elevator) may be used as shown in FIGS. 1 through 5 or the means of adjusting the mounting position of the bolt 16 may be used as shown in FIGS. 6 through 10.

What is claimed is:

1. An injection molding machine comprising:
   a fixed stationary platen;
   a mold attached to the stationary platen;
   an injection mechanism capable of moving in a direction toward or away from the stationary platen;
   a nozzle disposed on the injection mechanism;
   a moving mechanism for moving the injection mechanism in the direction toward or away from the stationary platen;
   a drive mechanism, connected to a first end of the moving mechanism, for moving the injection mechanism via the moving mechanism to thereby apply pressure relative to the mold from the nozzle;
   a first connection mechanism connected to a second end of the moving mechanism;
   an object supported on the first connection mechanism; and
   a second connection mechanism supported on the first connection mechanism via the object and supported on the stationary platen,
   wherein a supporting point, at which the first connection mechanism supports the object, is in a position disposed upwardly of a center of the nozzle.

2. The injection molding machine according to claim 1, wherein, when the pressure is applied to the mold from the nozzle by the drive mechanism, the first connection mechanism is pulled by the pressure in a direction of being away from the stationary platen.

3. The injection molding machine according to claim 1, wherein the object can be adjusted for a mounting position thereof relative to the first connection mechanism.

4. The injection molding machine according to claim 1, wherein the object is supported on the first connection mechanism so as to be adjusted for a mounting position thereof according to the mold.

5. The injection molding machine according to claim 1, further comprising:
   an elevator, disposed on the first connection mechanism, for supporting the object, wherein the object is thereby raised or lowered relative to the first connection mechanism.

6. The injection molding machine according to claim 5, wherein the object is supported on the elevator so as to be adjusted for a mounting position thereof according to the mold.

7. The injection molding machine according to claim 5, wherein the elevator includes a jack.

8. The injection molding machine according to claim 1, wherein the object includes a block.

9. The injection molding machine according to claim 1, wherein the first connection mechanism is movable in a direction toward or away from the stationary platen along a guideway mechanism disposed on a base frame.

10. The injection molding machine according to claim 1, wherein the drive mechanism is disposed on a side of the injection mechanism or a side of the first connection mechanism.

11. The injection molding machine according to claim 1, wherein the drive mechanism is disposed movably relative to a base frame.

12. The injection molding machine according to claim 1, wherein the first connection mechanism is not in contact with the stationary platen with a space formed therebetween.

13. The injection molding machine according to claim 1, wherein the object is positioned at an injection mechanism side with respect to the first connection mechanism.

14. An injection molding machine comprising:
   a fixed stationary platen;
   a mold attached to the stationary platen;
   an injection mechanism capable of moving in a direction toward or away from the stationary platen;
   a nozzle disposed on the injection mechanism;
   a moving mechanism for moving the injection mechanism in the direction toward or away from the stationary platen;
   a drive mechanism, connected to a first end of the moving mechanism, for moving the injection mechanism via the moving mechanism to thereby apply pressure relative to the mold from the nozzle;
   a first connection mechanism connected to a second end of the moving mechanism;
   an object supported on the first connection mechanism;
   an elevator, disposed on the first connection mechanism, for supporting the object, wherein the object is thereby raised or lowered relative to the first connection mechanism; and
   a second connection mechanism supported on the first connection mechanism via the object and supported on the stationary platen.

15. The injection molding machine according to claim 14, wherein the object is supported on the elevator so as to be adjusted for a mounting position thereof according to the mold.

16. The injection molding machine according to claim 14, wherein the elevator includes a jack.

* * * * *